Patented Nov. 9, 1926.

1,606,215

UNITED STATES PATENT OFFICE.

CHRISTIAN J. GAMBEL, OF NEW ORLEANS, LOUISIANA.

PROCESS OF REFINING UNWASHED SUGAR.

No Drawing.   Application filed May 13, 1922.   Serial No. 560,777.

This invention relates to a process of refining raw sugar, and has for its object to lessen the cost, to quicken the time, and to otherwise improve the processes heretofore carried out.

With these and other objects in view, the invention consists in the novel steps and combinations of steps constituting the process, all as will be more fully hereinafter disclosed and particularly pointed out in the claims.

In order that the exact invention may be the more clearly understood, it is said:

As at present practiced in sugar refineries, wherein high power decolorizing carbons are not used, the raw sugar is mixed with suitable quantities of water and liquors from previous processes, said solutions are sent through suitable washing machines, generally of the centrifugal type, in order to get rid of a large proportion of the coloring matter present, and the brown sugar which is recovered from the washing machines is next mixed with say, about 50% of its weight of water to form what is called a melt, which melt is carried to large containers called clarifiers where it is heated and thoroughly stirred. To the clarifiers are added lime and "Filter-cel", or other inert filtering material, to precipitate as much of the remaining coloring matter as possible, whereupon the sugar solution is passed through suitable filters, which take out still more of the coloring matter present, and then the liquor from the filter is passed over bone black to decolorize the same, whence the liquors or syrups pass to vacuum pans, where they are concentrated to such a degree that refined sugar may be made therefrom.

On the other hand, the washing apparatus is very expensive not only due to the investment in the machinery and its up-keep, but also due to the labor that has to be employed in connection therewith.

In carrying out this invention, I eliminate the washing plant altogether and carry the melt or solution of unwashed raw sugar containing about 50% of its weight of water, directly to the clarifiers where the usual quantities of lime and an inert filtering material are added to said solution, as well as from, say, ¾ of a pound to 2 pounds of "Carbrox", to each 100 pounds of sugar present. "Carbrox" is a high powered decolorizing carbon made by passing rice hulls out of contact with the air through a suitable carbonizing apparatus. These hulls are preferably carbonized at a temperature above that required to remove all the moisture present, and even at as high temperatures as can be economically attained in the furnace employed. After leaving said carbonizing apparatus, the carbonized rice hulls are ground and subjected to a 20% solution or a stronger solution, of caustic soda at a boiling temperature for about thirty minutes to an hour, or until a very large proportion of the silicious matter present has been removed, all as will be clear from British Patent #116,253 dated July 26, 1918, to Shilstone. The finely divided carbonized rice hull material is now recovered from the caustic soda solution, dried, and in its finely divided condition is placed in the clarifiers as above stated. From the clarifiers the sugar liquors are passed through suitable filters, preferably of the Sweetland type, and from said filters the filtered solution is passed over the well known bone black in the manner heretofore employed. After the liquor leaves the bone black it is found to be sufficiently decolorized to pass to the vacuum pans as heretofore where it is brought to a sufficient concentration for the making of refined sugar.

In other words, it is found that by the addition of the above mentioned "Carbrox" to the clarifiers one is enabled to eliminate the washing plant altogether, which effects a very great saving in a sugar refinery, for it is conservatively estimated by those familiar with the refining of sugar that the elimination of each employee attached to a washing plant effects a total saving in the capital invested of something like $8,000 or $10,000. As from seven to ten men, is a conservative estimate of the said employees in a refinery, it can easily be seen what a large saving in capital is had by the simple step of adding the proportion of "Carbrox" stated to the clarifiers.

But, in addition to this saving in capital invested by carrying out the process, one does not produce any black molasses at all, and in fact, produces relatively much less molasses than heretofore of any kind. No black molasses is produced because the washing step being omitted the dark colored syrups contained in the raw sugar are not carried away by the wash water as in the prior procedures, but are pumped along with the melt into the clarifying vats, where the "Carbrox" present decolorizes these said dark colored syrups, as well as the sugar in a single operation.

It thus results that at the end of the process, instead of having a relatively large quantity of low grade syrups to deal with, and which are of relatively small value, the operator has only high grade syrups and no black strap molasses at all. He further has a sugar which is lighter in color than under the prior processes, and a light colored molasses. These results are not only valuable in themselves, but they cause the procedure to constitute a cleaner process in the operating of the refinery, in that one has fewer grades of syrups to work with.

Further, by carrying out this process, one obtains a larger yield of refined sugars than heretobefore, because fewer rehandlings of liquors are required. It will be readily understood that in each handling mechanical losses occur, and a considerable proportion of these are saved. Also refiners meet losses due to inversion of liquors each time heat is applied to same. By this process, the sugar solutions may be treated in an alkaline condition which lessens the amount of inversion; and a considerable portion of said losses are also saved as a result of the lessened number of necessary heatings of the liquors. A saving is also effected, because of the elimnation of the washing machine, and the greater celerity of the procedure.

It is obvious that those skilled in the art may vary the details of the procedure without departing from the spirit of the invention, and therefore, I do not wish to be limited to the foregoing disclosure except as may be required by the claims.

What I claim is:—

1. The herein described process of refining sugar which consists in subjecting a solution of unwashed raw sugar to a clarifying partial decolorizing action in the presence of lime, an inert filtering material, and a quantity of "Carbrox" sufficient to effect a partial decolorization of said solution while maintaining the latter in an alkaline condition; filtering said clarified solution; decolorizing the filtrate thus produced; and concentrating said decolorized filtrate sufficiently to produce refined sugar, substantially as described.

2. The herein described process of refining sugar which consists in clarifying and partially decolorizing a solution of unwashed raw sugar in the presence of lime, an inert filtering medium and a quantity of "Carbrox" equal to more than one and three quarters pounds to each one hundred pounds of sugar present; filtering said clarified solution; passing the filtrate over bone black to complete decolorization thereof; and producing refined sugar from the decolorized solution, substantially as described.

3. The herein described process of refining sugar which consists in clarifying and partially decolorizing a solution of unwashed raw sugar in the presence of lime, an inert filtering medium and a quantity of "Carbrox" equal to more than two pounds to each one hundred pounds of sugar present; maintaining said solution in an alkaline condition; filtering said clarified solution; passing the filtrate over bone black to complete the decolorization thereof; and producing refined sugar from the decolorized solution, substantially as described.

4. The process of refining sugar which consists in clarifying and partially decolorizing an alkaline solution of unwashed sugar in the presence of lime, an inert filtering material and more than three fourths of a pound of "Carbrox" to each one hundred pounds of sugar present; filtering the clarified and partially decolorized solution thus obtained; completing the decolorization of the filtered solution by subjecting it to the action of bone black; and producing refined sugar from the decolorized solution thus obtained.

5. The herein described process of refining sugar which consists in subjecting a solution of unwashed raw sugar to a clarifying partial decolorizing action in the presence of lime, an inert filtering material, and a quantity of "Carbrox" of as little as ten ounces to each hundred pounds of sugar present and sufficient to effect a partial decolorization of said solution; filtering said clarified solution; decolorizing the filtrate thus produced; and concentrating said decolorized filtrate sufficiently to produce refined sugar, substantially as described.

6. The herein described process of refining sugar which consists in subjecting a solution of unwashed raw sugar to a clarifying partial decolorizing action in the presence of lime and a quantity of "Carbrox" of as little as a pound to each hundred pounds of sugar present and sufficient to effect a partial decolorization of said solution; maintaining said solution in an alkaline condition; filtering said clarified solution; decolorizing the filtrate thus produced; and concentrating said decolorized filtrate sufficiently to produce refined sugar, substantially as described.

7. The herein described process of refining sugar which consists in subjecting a solution of unwashed raw sugar to a clarifying partial decolorizing action in the presence of lime and a quantity of "Carbrox" of as little as one and one half pounds to each one hundred pounds of sugar present and sufficient to effect a partial decolorization of said solution; fitering said clarified solution; decolorizing the filtrate thus produced; and concentrating said decolorized filtrate sufficiently to produce refined sugar, substantially as described.

In testimony whereof I affix my signature.

CHRISTIAN J. GAMBEL.